United States Patent
Iyama

(10) Patent No.: US 7,373,016 B2
(45) Date of Patent: May 13, 2008

(54) IMAGE SYNTHESIZING APPARATUS AND IMAGE SYNTHESIZING METHOD

(75) Inventor: Takayuki Iyama, Tokyo (JP)

(73) Assignee: Sony Corporation, Tokyo (JP)

( * ) Notice: Subject to any disclaimer, the term of this patent is extended or adjusted under 35 U.S.C. 154(b) by 603 days.

(21) Appl. No.: 09/818,399

(22) Filed: Mar. 27, 2001

(65) Prior Publication Data

US 2001/0026329 A1     Oct. 4, 2001

(30) Foreign Application Priority Data

Mar. 30, 2000     (JP)     ............ P2000-094283

(51) Int. Cl.
   *G06K 9/36* (2006.01)
   *H04N 9/74* (2006.01)
   *H04N 1/387* (2006.01)
(52) U.S. Cl. ............ 382/284; 348/584; 358/450
(58) Field of Classification Search ............ 382/284; 358/450; 348/584–601
   See application file for complete search history.

(56) References Cited

U.S. PATENT DOCUMENTS 5,355,174 A * 10/1994 Mishima ............ 348/592
5,644,364 A *  7/1997 Kurtze et al. ............ 348/584
5,696,892 A * 12/1997 Redmann et al. ............ 345/582
6,573,905 B1 *  6/2003 MacInnis et al. ............ 345/629

OTHER PUBLICATIONS

Relevant excerpts from U.S. Appl. No. 60/170,866.*

* cited by examiner

*Primary Examiner*—Matthew C. Bella
*Assistant Examiner*—Wes Tucker
(74) *Attorney, Agent, or Firm*—Frommer Lawrence & Haug LLP; William S. Frommer; Thomas F. Presson

(57) ABSTRACT

An image synthesizing apparatus according to the present invention comprises coefficient setting means for setting a blending coefficient $\alpha(0 \leq \alpha \leq 1)$ at a specified value when a value of a specific picture element component included in picture element components A of a first image is a predetermined value; and arithmetic means for performing an operation on the picture element components A, picture element components B of a second image, and the blending coefficient α as follows: $A*\alpha+B*(1-\alpha)$, and performing the operation on all the picture element components A and the picture element components B of a picture element that has the specific picture element component representing the predetermined value by using the blending coefficient α set by the coefficient setting means.

12 Claims, 8 Drawing Sheets

F I G. 6
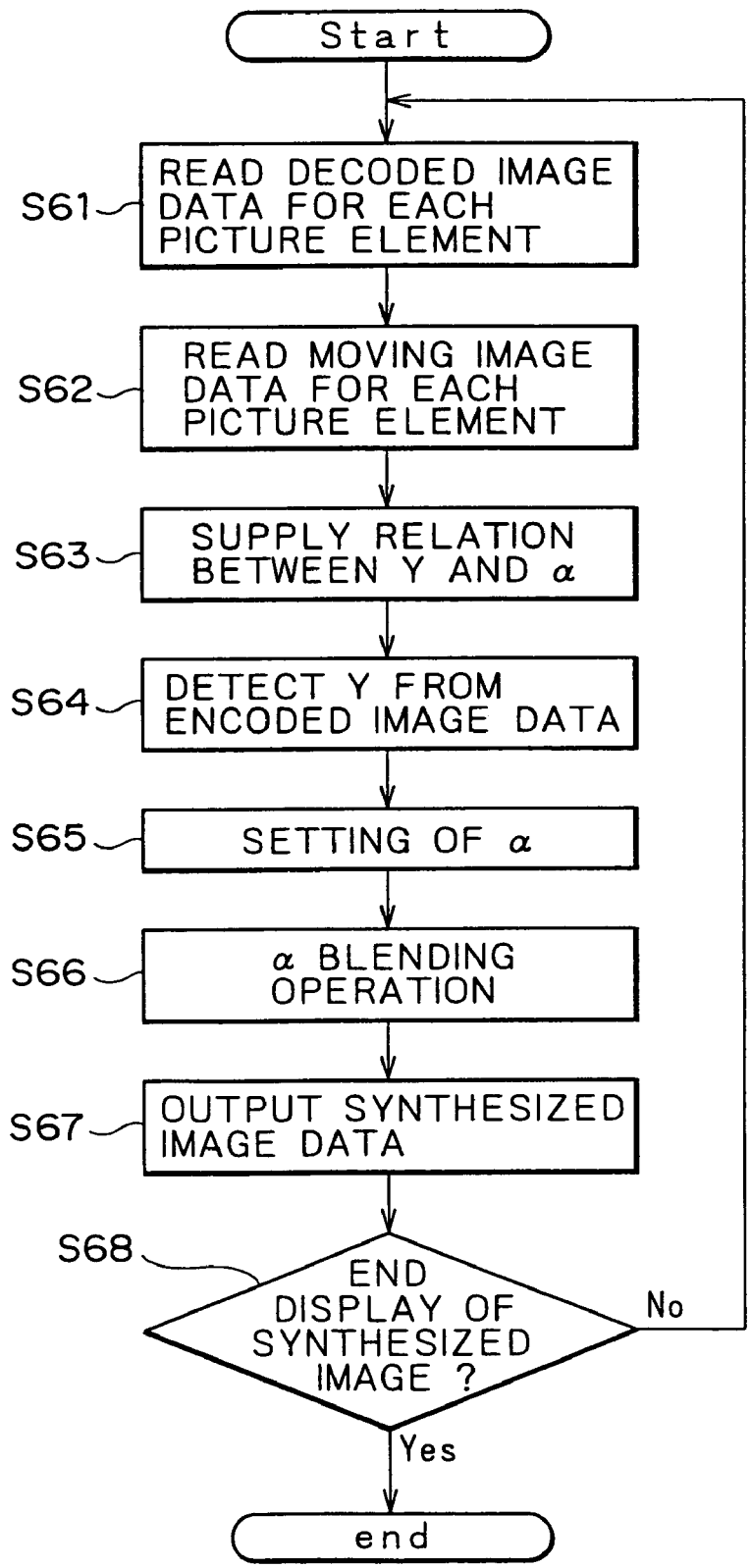

FIG.8

COLOR LOOK-UP TABLE (CLUT)

| COORDINATES | Y | Cb | Cr | α |
|---|---|---|---|---|
| 0 0 | 100 | 50 | 100 | 20 |
| 0 1 | 100 | 100 | 50 | 100 |
| 1 0 | 200 | 50 | 200 | 200 |
| 1 1 | 200 | 200 | 50 | 200 |

IMAGE SYNTHESIZING APPARATUS AND IMAGE SYNTHESIZING METHOD

BACKGROUND OF THE INVENTION

The present invention relates to an image synthesizing apparatus for synthesizing two pieces of image data and outputting synthesized image data, and particularly to an image synthesizing apparatus for effecting image synthesis by using an α blending method.

Recently, functions of a television receiver have been diversified. Since conventional mechanical switches such for example as buttons provided on the body of the television receiver and a remote control are not sufficient for setting the functions of the television receiver, the functions are more often set by menu operation such as displaying a menu image on a monitor screen, selecting a setting item, and supplying an input on a displayed setting screen. In some of such cases, an image for menu operation is superimposed on a television image currently selected for viewing by a television tuner on the monitor screen.

FIG. 7 shows an example of a display screen of a television receiver for such menu operation.

FIG. 7 shows a menu screen 71 to be superimposed, a television screen 72 selected by a television tuner or the like, and a synthesized screen 73 in which the menu screen 71 is superimposed on the television screen 72. Selection buttons 71a, 71b, and 71c shown on the menu screen 71 for example represent a "sound selection" button for switching between a main-channel sound and a sub-channel sound, a "channel" button for setting the display number of a channel, and a "return" button for stopping the display of the menu screen, respectively.

The television screen 72 being viewed can be seen through the menu selection buttons 71a, 71b, and 71c on the synthesized screen 73 in which the menu screen 71 is superimposed on the television screen 72. An image synthesizing method that makes one image seen through the other image in such a manner is referred to as α blending. This processing method is often used for menu operation on a television screen.

According to the α blending method, when an image to be superimposed is set to be A, a background image is set to be B, and a blending coefficient α is set to be $\alpha(0 \leq \alpha \leq 1)$, an operation is performed on each element forming respective one of the images A and B so that an output image S satisfies the following equation, and then the result is outputted.

$$S = A^* \alpha + B^* (1-\alpha)$$

An arbitrary value in a range of $0 \leq \alpha \leq 1$ is selected for the blending coefficient α to thereby define transparency; when α is zero, the image A to be superimposed on the image B is completely transparent, while when α is unity, the image A to be superimposed on the image B is completely opaque.

When the menu screen is superimposed on the television screen by using the α blending method as described above, the blending coefficient α is generally determined for each menu screen using a table referred to as a color look-up table (hereinafter referred to as a CLUT).

FIG. 8 shows an example of a CLUT. In FIG. 8, Y, Cb, and Cr are picture element components that form a picture element, and Y represents a luminance component while Cb and Cr represent color difference components. Coordinate values represent coordinates (x, y) of a picture element on a monitor screen obtained when an x-component is taken in a horizontal direction and a y-component is taken in a vertical direction. In order to simplify description, it is assumed that only four sets of coordinates are present in FIG. 8. The values of the luminance component Y, the color difference component Cb, the color difference component Cr, and α are converted into 8-bit data for convenience of operation.

In order to change transparency of a synthesized screen for each picture element, the α blending method using a CLUT requires information on an α value for each picture element, as shown in FIG. 8. Therefore, the finer the picture elements on a monitor screen, the larger the amount of information of the CLUT, thereby increasing memory size and the load of the above-mentioned operation processing, and thus decreasing image-generating rate. In order to deal with the problem, circuit scale, power consumption, and cost of the television receiver must be increased.

SUMMARY OF THE INVENTION

The present invention has been made in view of the above problems. It is an object of the present invention to provide an image synthesizing apparatus that reduces the amount of data handled in image synthesis processing by α blending and thereby reduces the load of image synthesis processing.

It is another object of the present invention to provide an image synthesizing method that reduces the amount of data used for α blending and thereby reduces the load of image synthesis processing.

In order to solve the above problems, according to an aspect of the present invention, there is provided an image synthesizing apparatus for synthesizing two images, including coefficient setting means for setting a blending coefficient $\alpha(0 \leq \alpha \leq 1)$ at a specified value when a value of a specific picture element component included in picture element components A of a first image is a predetermined value; and arithmetic means for performing an operation on the picture element components A, picture element components B of a second image, and the blending coefficient α as follows:

$$A^* \alpha + B^* (1-\alpha)$$

and performing the operation on all the picture element components A and the picture element components B of a picture element that has the specific picture element component representing the predetermined value by using the blending coefficient α set by the coefficient setting means.

When a specific component of a picture element that forms the first image represents a predetermined value, the image synthesizing apparatus according to the present invention performs α blending operation by the arithmetic means on all the picture element components of the picture element by fixing the blending coefficient α at a specified value, thereby eliminating the need for setting the blending coefficient α for every picture element. Thus, the amount of information for the operation is reduced, and thereby it is possible to reduce required memory capacity and the load of image processing.

According to another aspect of the present invention, there is provided an image synthesizing method for synthesizing two images, wherein an operation is performed on picture element components A of a first image, picture element components B of a second image, and a blending coefficient $\alpha(0 \leq \alpha \leq 1)$ as follows:

$$A^* \alpha + B^* (1-\alpha)$$

and when a specific picture element component included in the picture element components A represents a predetermined value, the blending coefficient α is set at a specified value in the operation on all the picture element components A and the picture element components B of a picture element that has the specific picture element component representing the predetermined value.

According to the image synthesizing method, when a specific component of a picture element that forms the first image represents a predetermined value, α blending operation is performed on all the picture element components of the picture element by fixing the blending coefficient α at a specified value, thereby eliminating the need for setting the blending coefficient α for every picture element. Thus, the amount of information for the operation is reduced, and thereby it is possible to reduce required memory capacity and the load of image processing.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 6 is a flow chart of image synthesis processing by an image synthesizing unit;

FIG. 8 shows an example of a color look-up table (CLUT).

DETAILED DESCRIPTION OF PREFERRED EMBODIMENTS

Preferred embodiments of the present invention will hereinafter be described with reference to the drawings.

Figure 1:
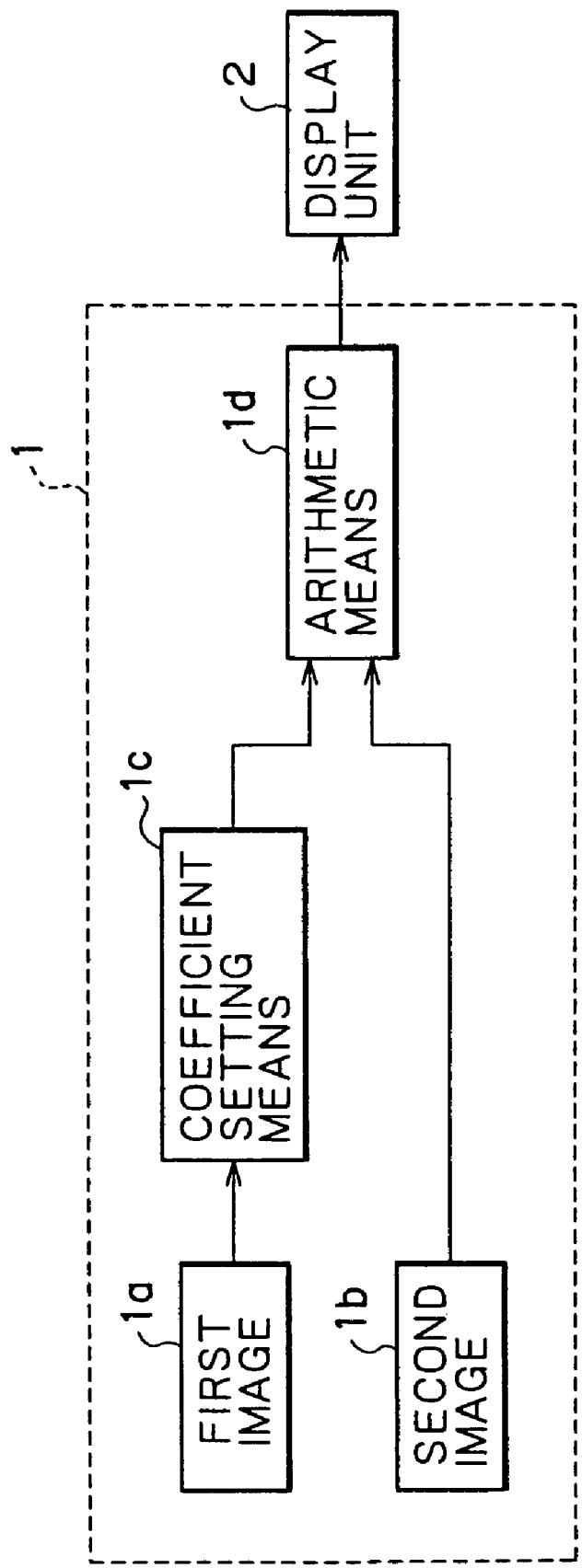
FIG. 1 is a block diagram for illustrating principles of the present invention.

FIG. 1 is a block diagram for illustrating principles of the present invention.

An image synthesizing apparatus 1 synthesizes a first image 1a and a second image 1b at arithmetic means 1d by α blending to output data of a synthesized image to a display unit 2 or the like. The first image 1a and the second image 1b are each formed by a set of a plurality of adjacent picture elements, and each of the picture elements is formed by a plurality of picture element components. The synthesized image S is outputted after the following operation:

$$S = A*\alpha + B*(1-\alpha) (0 \leq \alpha \leq 1)$$

where picture element components of the first image 1a are A, picture element components of the second image 1b are B, and α is a blending coefficient for defining transparency; when α=0, the first image 1a is completely transparent while when α=1, the first image 1a is completely opaque. The image synthesizing apparatus 1 performs such an operation on picture element components of all the picture elements that form each image.

Coefficient setting means 1c in the image synthesizing apparatus 1 detects data of a specific picture element component from the picture element components A that form the first image 1a. When the data represents a predetermined value, the coefficient setting means 1c sets the blending coefficient α used for the blending operation at a specified value. The arithmetic means 1d performs the above operation on all picture element components A and B. At this point, the arithmetic means 1d performs the above operation on all picture element components A and B of the picture elements whose specific picture element components represent the predetermined value by using the blending coefficient α set by the coefficient setting means 1c. Synthesized image data outputted after the arithmetic means 1d has performed the operation is displayed on the display unit 2 as a synthesized image or stored in a memory not shown in the figure.

When the picture element components A and B are formed by two kinds of components, that is, a luminance component Y and a color difference component Cb or Cr, for example, the coefficient setting means 1c detects the value of the luminance component Y from all the picture element components A of the first image 1a, and when the value of the luminance component Y is zero, the coefficient setting means 1c sets the blending coefficient α at zero. According to the setting by the coefficient setting means 1c, the arithmetic means 1d performs the operation on all the picture element components, that is, the luminance component Y and the color difference component Cb or Cr of a picture element whose luminance component Y is zero by setting the blending coefficient α to be zero. As a result, when the picture elements of the first image 1a have a zero luminance component Y, the first image 1a becomes completely transparent in the displayed synthesized image and therefore is not displayed on the screen, and only the second background image 1b is displayed.

Such processing by the coefficient setting means 1c and the arithmetic means 1d is realized by a processor, a ROM (Read Only Memory) and a RAM (Random Access Memory) using semiconductors, or an integrated circuit designed specifically for that purpose, for example.

A specific example of processing by the image synthesizing apparatus 1 will next be described in detail.

In the present embodiment, image data in an ITU-601 format, which is referred to as a 4:2:2 format, is used as an example of data of an image to be displayed. Incidentally, ITU stands for the International Telecommunication Union.

Figure 2:
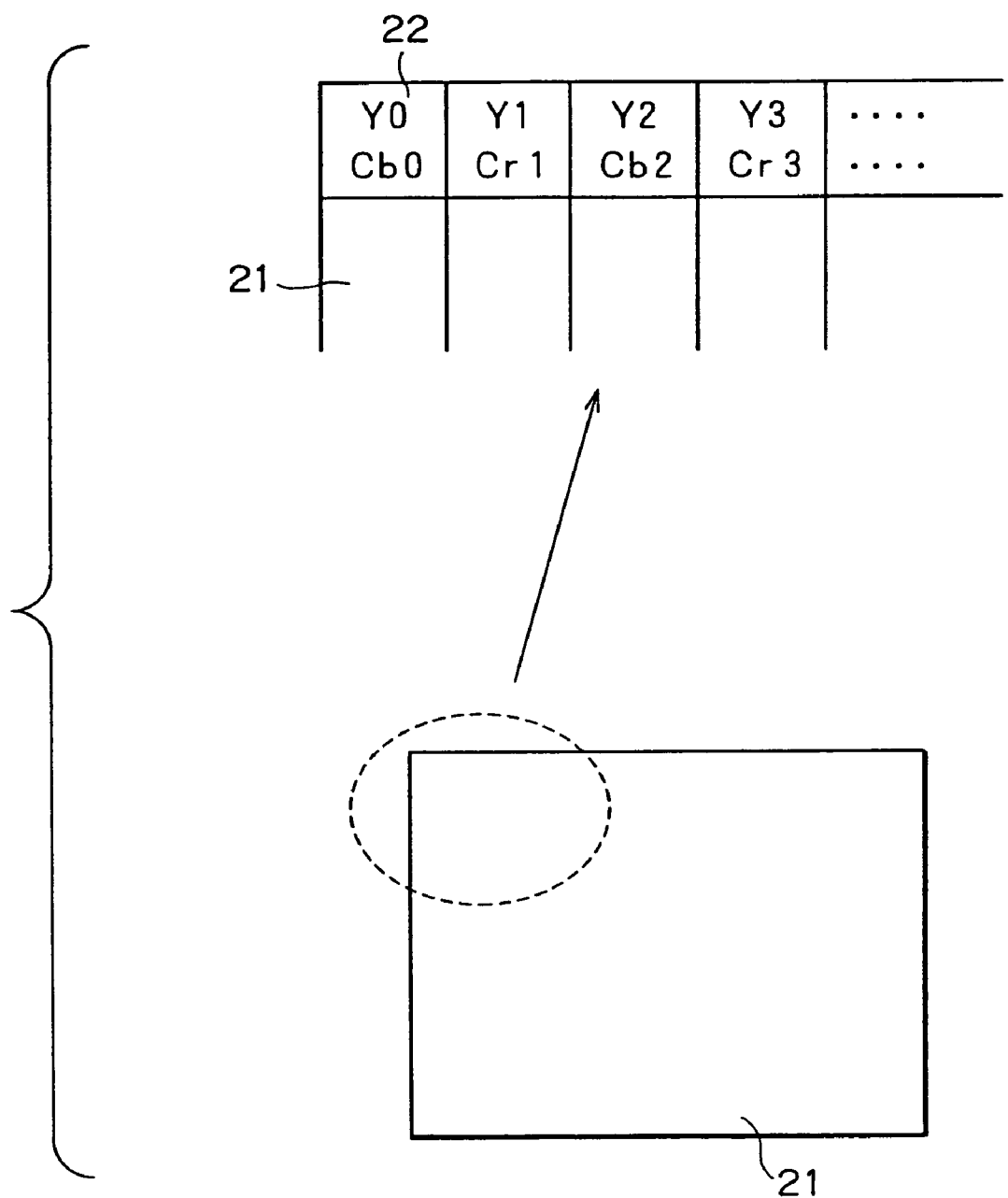
FIG. 2 is a schematic diagram of image data.

FIG. 2 is a schematic diagram of image data.

Picture element components of the image data in the 4:2:2 format are represented by luminance components Y and color difference components Cb and Cr, which are each formed by 8-bit data. The sampling frequency of the luminance component Y is 13.5 MHz, while the sampling frequency of the color difference components Cb and Cr is 6.75 MHz. Since of the color difference components Cb and Cr, one with a higher frequency component can be discarded, each picture element 22 in a display screen 21 is formed by a combination of two picture element components, that is, a luminance component Y and a color difference component Cb or a luminance component Y and a color difference component Cr, as shown in FIG. 2. Although the actual value of the luminance component Y ranges from 0 to 1 and the actual value of the color difference components Cb and Cr ranges from −0.5 to 0.5, data of these components is converted into 8-bit form in the 4:2:2 format, and it is specified that the luminance component Y, the color difference component Cb, and the color difference component Cr range from 16 to 235, from 16 to 240, and from 16 to 240, respectively.

According to the present invention, attention is directed to a specific component of the picture element components in setting the blending coefficient α used for the above-mentioned operation so that the blending coefficient α is set according to the value of the specific component. An example in which the luminance component Y is used as the specific component will be described in the following.

Figure 3:
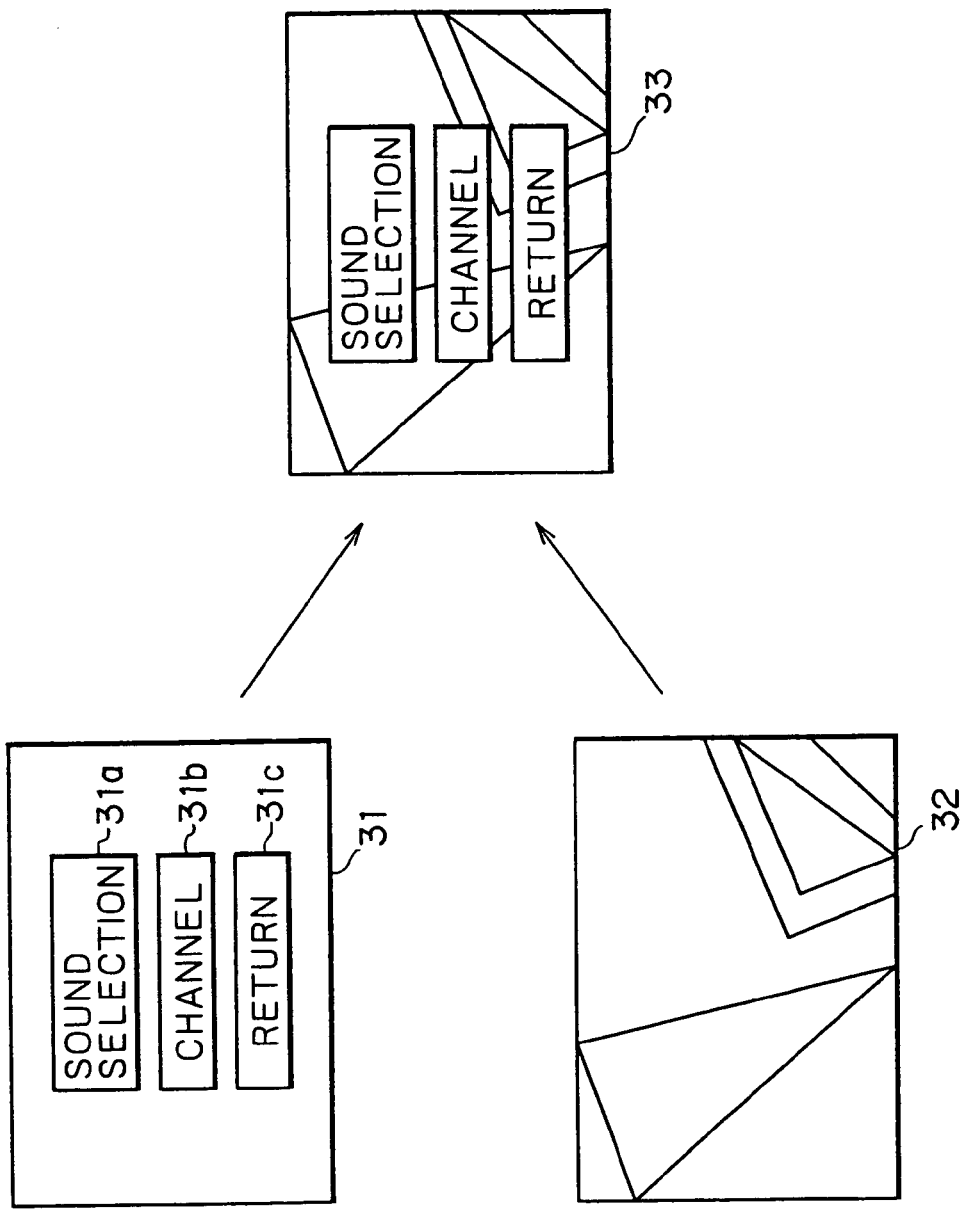
FIG. 3 shows an example of screens to be synthesized.
Figure 4:
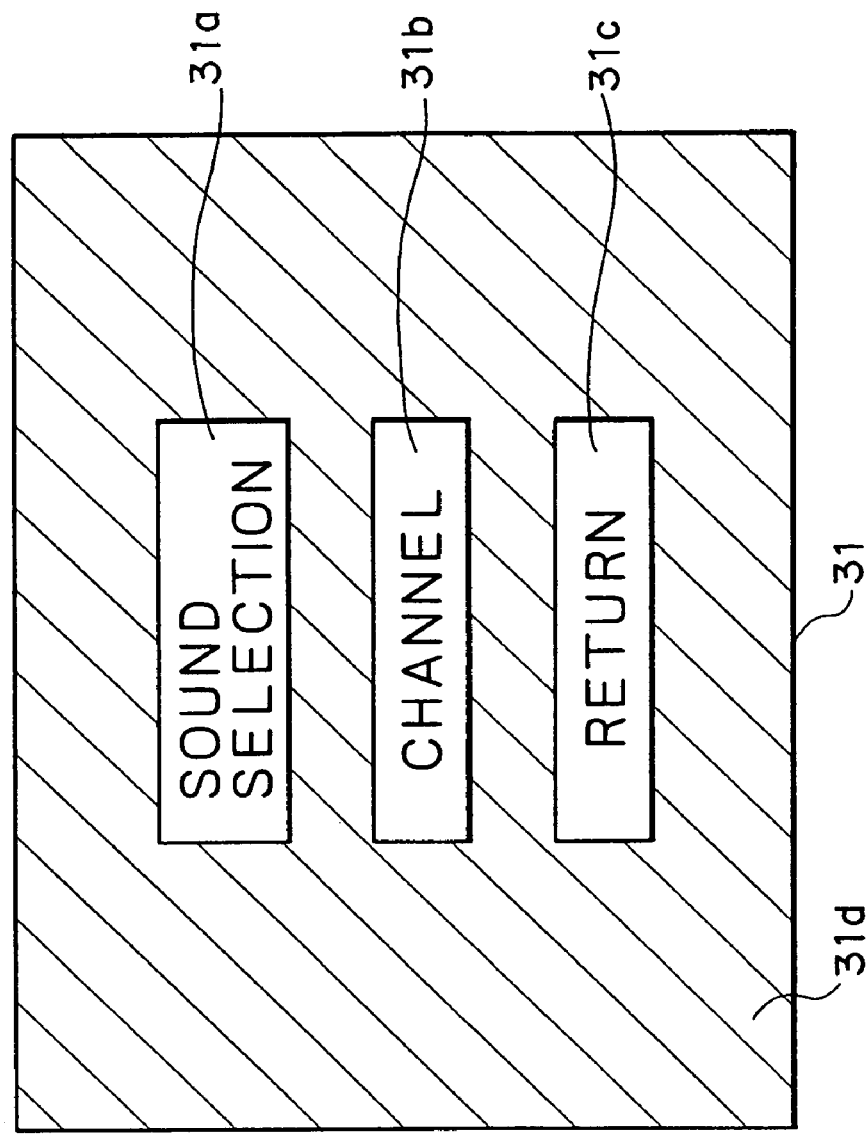
FIG. 4 is an enlarged view of a menu screen shown in FIG. 3.

FIG. 3 shows an example of screens to be synthesized. FIG. 4 is an enlarged view of a menu screen 31 shown in FIG. 3.

In the example shown in FIG. 3, the menu screen 31 for setting various functions of the television receiver is superimposed on a television screen 32 selected for viewing by a TV tuner or the like. Specifically, the aforementioned first image 1a in FIG. 1 corresponds to the menu screen 31 to be superimposed and the second image 1b corresponds to the television screen 32 being viewed. The menu screen 31 and the television screen 32 are both in the 4:2:2 format, and thus are obtained from image data comprising the same number of picture elements, for example 720×480.

When the operation for synthesizing these images by a blending is performed, the blending coefficient α is set according to the value of the luminance component Y forming each picture element of the menu screen 31 to be superimposed. The luminance component Y of the menu screen 31 assumes values other than the specified values (16 to 235) of the luminance component Y to know the setting of the blending coefficient α.

For example, when the luminance component Y is zero, the blending coefficient α is set at zero, while the luminance component Y is other than zero, the blending coefficient α is set at unity. When the luminance component Y of a picture element is zero, operation on not only the luminance component Y but also the color difference components Cb and Cr of the picture element is performed by setting the blending coefficient α at zero. Similar operation is performed when the luminance component Y is other than zero. Such operation is performed on all picture elements.

In FIGS. 3 and 4, selection buttons 31a, 31b, and 31c shown on the menu screen 31 for example represent a "sound selection" button for switching between a main-channel sound and a sub-channel sound, a "channel" button for setting the display number of a channel, and a "return" button for stopping the display of the menu screen, respectively.

Since monitor display for function setting is not necessary in a shaded portion 31d of FIG. 4 that does not include portions of the selection buttons 31a, 31b, and 31c, the luminance components Y of picture elements in the shaded portion 31d are set at zero. Thus, operation on all picture elements included in the shaded portion 31d is performed by setting the blending coefficient α at zero, whereby only the background television screen 32 is displayed in a synthesized screen 33 shown in FIG. 3. Luminance components Y in the portions of the selection buttons 31a, 31b, and 31c have numerical values set within a specified range of values that indicate normal image components. Thus, operation on picture elements in the portions of the selection buttons 31a, 31b, and 31c is performed by setting the blending coefficient α at unity, whereby only the selection buttons 31a, 31b, and 31c are displayed on the synthesized screen 33, as shown in FIG. 3.

It is to be noted that the blending coefficient α is not limited to zero and unity as set in the above example. For example, the blending coefficient α may be set at zero when the luminance component Y is zero, and the blending coefficient α may be set at 0.5 when the luminance component Y is other than zero. In this case, the portions of the selection buttons 31a, 31b, and 31c when the luminance components Y are other than zero will be displayed on the synthesized screen 33 of the monitor as an image of the menu screen 31 being superimposed on the television screen 32.

Thus, operation is performed by setting the blending coefficient α according to the value of the luminance component Y, thereby eliminating the need for a conventionally required CLUT in which a blending coefficient α is assigned to each picture element. Therefore, a memory for storing the CLUT having a large amount of data is not required, thereby reducing the scale and the power consumption of the circuit to be mounted in the apparatus. In addition, the stepwise setting of the blending coefficient α makes it possible to achieve a simpler configuration of a circuit for performing the operation and thereby increase processing rate in image synthesis.

Moreover, since the ITU-601 format employed in the example described above specifies that the value of the luminance component Y is 16 to 235, the value of the luminance component Y=0 is not included in a range of values that can be assumed by original image data. Therefore, the value of the luminance component Y=0 does not affect display of image data for an image having luminance components Y set at such values, that is, the menu screen 31 as shown in FIG. 3. Thus, the value of the luminance component Y for setting the blending coefficient α at zero may be any of 0 to 15.

Even in the case of image data in a different format from ITU-601, when a range of values assumed by the data is determined, the present invention can be carried out by assigning data having a value outside the range. According to the specifications of the ITU-601 format employed in the example described above, each picture element includes a luminance component Y without exception, and therefore a luminance component Y is used to know a setting value of the blending coefficient α. However, when image data in a different format includes a color difference component or a color component without exception, for example, the color difference component or the color component may be used for the above purpose.

Figure 5:
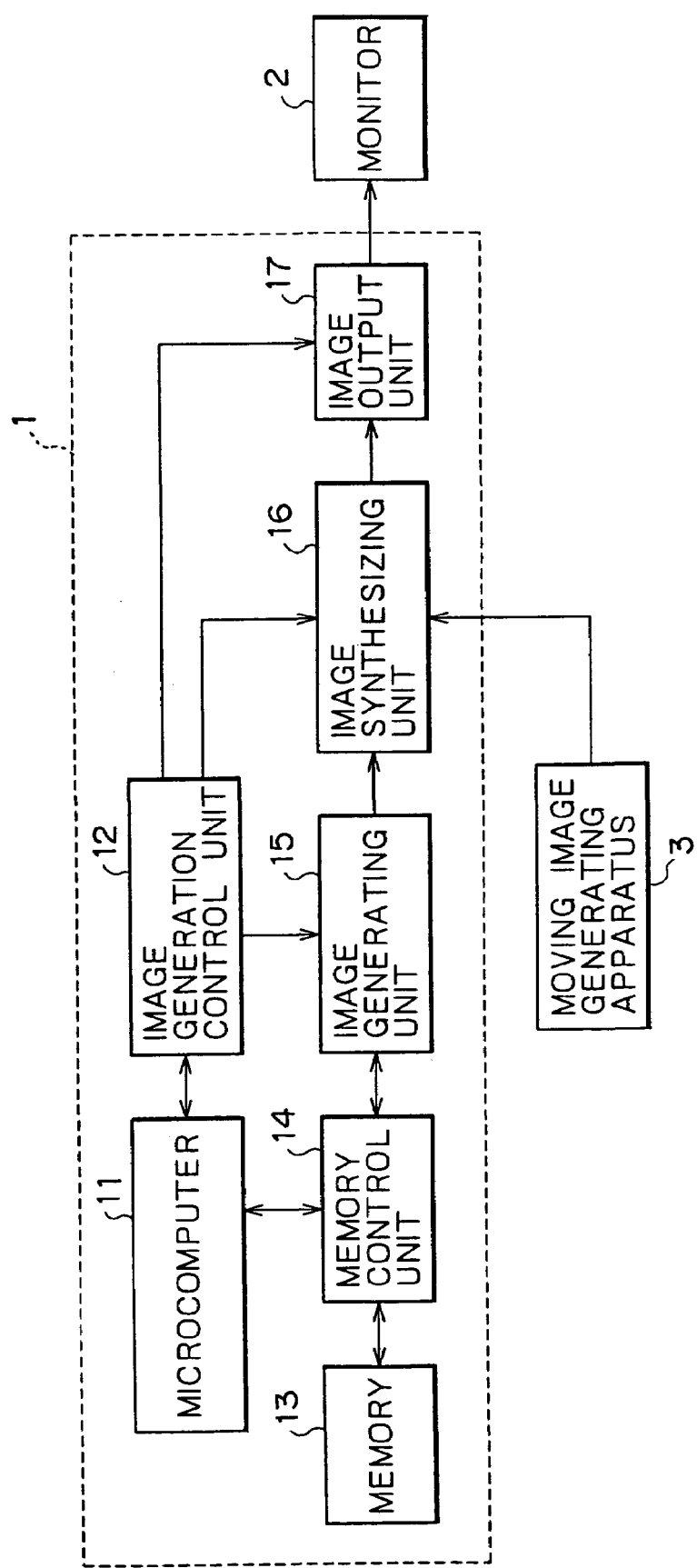
FIG. 5 shows an example of the main configuration of an image synthesizing apparatus according to the present invention.
Figure 7:
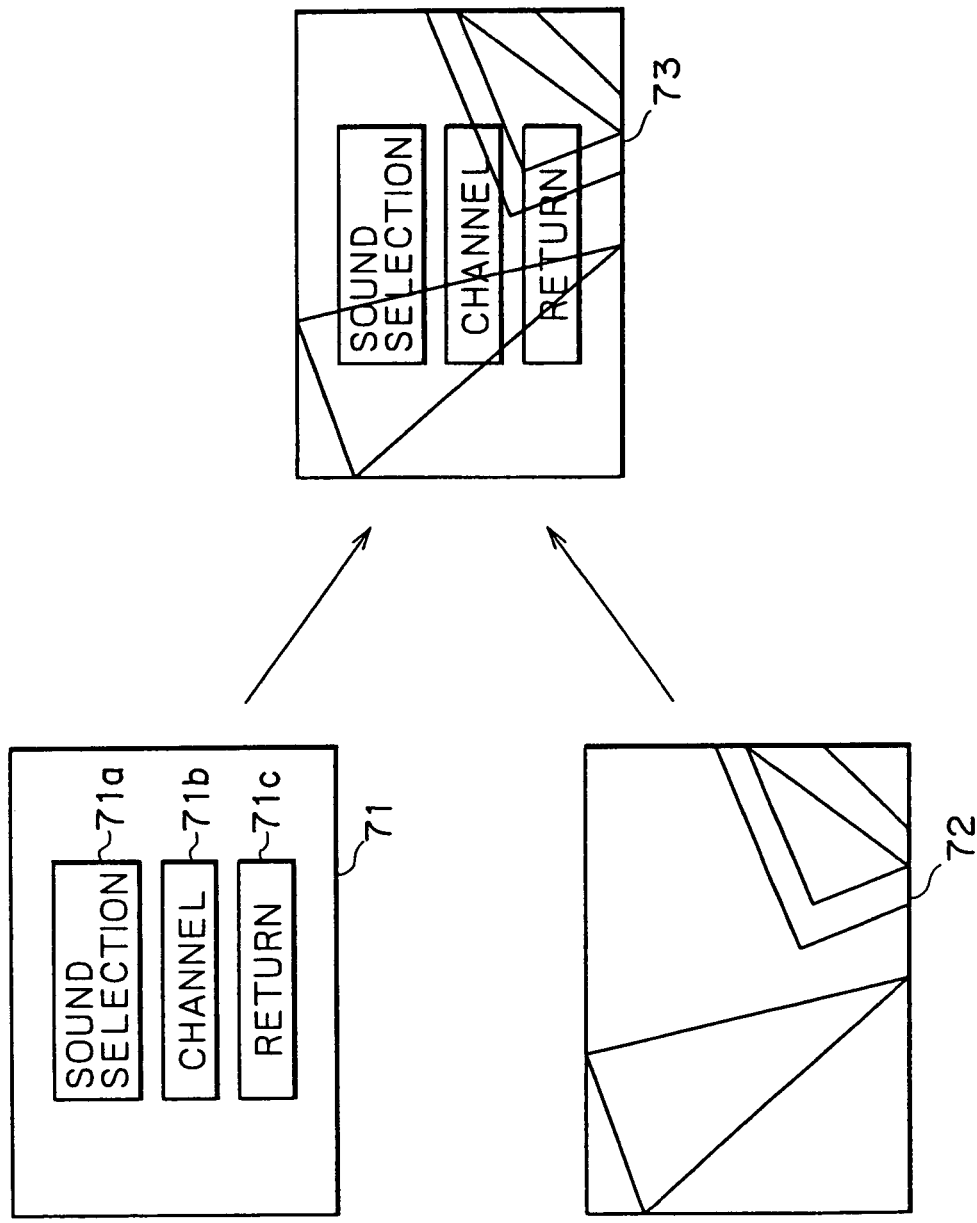
FIG. 7 shows an example of a display screen of a television receiver for menu operation.

Next, FIG. 5 shows an example of the main configuration of an image synthesizing apparatus according to the present invention.

An image synthesizing apparatus 1 comprises a microcomputer 11, an image generation control unit 12, a memory 13, a memory control unit 14, an image generating unit 15, an image synthesizing unit 16, and an image output unit 17. The image synthesizing apparatus 1 captures moving images generated by a moving image generating apparatus 3, and synthesizes an image stored in the memory 13 with each of the moving images to output the result to a monitor 2 for display. The image synthesizing apparatus 1 is for example disposed inside a television receiver, in which case a television image receiving apparatus corresponds to the moving image generating apparatus 3, and the image synthesizing apparatus 1 superimposes a menu image or the like generated by the microcomputer 11 upon a received television image to thereby display the result on the monitor 2.

The microcomputer 11 is connected to the image generation control unit 12 and the memory control unit 14, and controls the image generating unit 15, the image synthesizing unit 16, and the image output unit 17 via the image generation control unit 12. The memory control unit 14 controls memory access by the microcomputer 11 and the image generating unit 15, and also writes and reads various data to and from the memory 13. Functions of the image generation control unit 12, the memory control unit 14, the image generating unit 15, and the image synthesizing unit 16 are realized by control and processing by a processor, a ROM and a RAM that use semiconductors and the like, or an integrated apparatus designed specifically for that purpose. The memory 13 is a ROM and RAM using semiconductors and the like, or a hard disk formed by a magnetic disk or the like.

The microcomputer 11 generates encoded image data in which image data such as luminance components Y, color difference components Cb, and color difference components Cr is encoded, and then writes the encoded image data to the memory 13 via the memory control unit 14. In generating the encoded image data, image data inputted from another image generating apparatus by an input unit not shown in the figure provided for the image synthesizing apparatus 1 is encoded into specified data form by control and processing by the microcomputer 11 to be stored in the memory 13. The memory 13 also stores specified information such as a display position and a display size of image data to be displayed on the monitor 2.

When processing for image synthesis begins, the encoded image data and information such as its display position and display size are supplied from the memory 13 to the image generating unit 15 via the memory control unit 14. The image generating unit 15 decodes the encoded image data according to a control signal from the image generation control unit 12 to thereby generate decoded image data, and then outputs the decoded image data to the image synthesizing unit 16 as image data for display on the monitor 2.

Under control of the image generation control unit 12, the image synthesizing unit 16 reads the decoded image data from the image generating unit 15 and moving image data from the moving image generating apparatus 3. The image synthesizing unit 16 sequentially reads picture element components that form picture elements from these pieces of data, and obtains the value of a luminance component Y from the picture element components of the decoded image data. The image synthesizing unit 16 sets a blending coefficient α corresponding to the value of the luminance component Y by using information on the relation between the luminance component Y and the blending coefficient α supplied from the image generation control unit 12. Then the image synthesizing unit 16 performs α blending operation by using the blending coefficient α set for a picture element of the moving image data and the decoded image data that includes the luminance component Y, and thereafter outputs the result to the image output unit 17. The information on the relation between the luminance component Y and the blending coefficient α may be preset in the image generation control unit 12, or the relation between the luminance component Y and the blending coefficient α may be specified by the user and stored in the memory 13 or the like by an input unit not shown in the figure so that the relation between the luminance component Y and the blending coefficient α is read by the image synthesizing unit 16.

The image output unit 17 is connected to the monitor 2, and according to a control signal from the image generation control unit 12, converts display image data of a synthesized image generated at the image synthesizing unit 16 into a data form for output that enables display of the data on a display screen of the monitor 2.

FIG. 6 is a flow chart of image synthesis processing by the image synthesizing unit 16.

When image synthesis processing begins, encoded image data stored in the memory 13 is read to be decoded by the image generating unit 15, and decoded image data for each picture element is supplied to the image synthesizing unit 16 (S61). At the same time, moving image data for each picture element at the same position, serving as a background of the image of the decoded image data, is supplied from the moving image generating apparatus 3 to the image synthesizing unit 16 (S62).

Next, the image generation control unit 12 supplies information on relation between the luminance component Y and the blending coefficient α of the decoded image data (S63). Under the control of the image generation control unit 12, the luminance component Y is detected from picture element components included in picture elements of the read decoded image data, and is then subjected to comparison with the information on the relation between the luminance component Y and the blending coefficient α (S64). The value of the blending coefficient α corresponding to the detected luminance component Y is set according to the information (S65). Then, α blending operation is performed on each picture element component by using the set blending coefficient α (S66).

Synthesized image data obtained from the picture element components after the operation is outputted to the image output unit 17 (S67). When display of a synthesized image is to be continued (s68), a picture element at the next position is read from the decoded image data and the moving image data (S61), and thereafter the same operation is performed on picture element components of the picture element.

After operation on all the picture elements of one image is finished, the moving image generating apparatus 3 supplies the next piece of moving image data for operation on each picture element of the next image. Thus, a loop from S61 to S67 is repeated until display of a synthesized image is stopped and thereby image synthesis processing is finished.

It is to be noted that in the embodiment described above, the background image is a moving image and the image to be superimposed is a still image; however, these images may be either a moving image or a still image as long as the image to be superimposed has specific data written into the luminance components Y of picture elements that do not need to be displayed on the monitor. Thus, the present invention is applicable regardless of whether these images are moving images or still images.

As described above, when a specific component of a picture element that forms one image represents a predetermined value, the image synthesizing apparatus according to the present invention performs α blending operation on all the picture element components of the picture element by fixing the blending coefficient α at a specified value, thereby eliminating the need for setting the blending coefficient α for every picture element. Thus, the amount of information for the operation is reduced, and thereby it is possible to reduce required memory capacity and the load of image processing.

In addition, when a specific component of a picture element that forms one image represents a predetermined value, the image synthesizing apparatus according to the present invention performs α blending operation on all the picture element components of the picture element by fixing the blending coefficient α at a specified value, thereby eliminating the need for setting the blending coefficient α for every picture element. Thus, the amount of information for the operation is reduced, and thereby it is possible to reduce required memory capacity and the load of image processing.

While a preferred embodiment of the present invention has been described using specific terms, such description is for illustrative purposes only, and it is to be understood that changes and variations may be made without departing from the spirit or scope of the following claims.

What is claimed is:

1. An image synthesizing apparatus for synthesizing two images, comprising:
   coefficient setting means for setting a blending coefficient $\alpha(0\leq\alpha\leq1)$ for each of a plurality of specific picture elements of a first image at a single specified value,
   wherein the single specified value is proportional to a value of a specific picture element component of the plurality of specific picture elements of the first image included in picture element components A of the first image when said value of the specific picture element is not zero,
   wherein said single specified value is set to zero when said value of the specified picture element is zero; and
   arithmetic means for performing an operation on each of the plurality of said picture element components A, and each of a plurality of picture element components B of a second image in accordance with the single specified value of each of said blending coefficients $\alpha$, thereby eliminating a need for setting a blending coefficient for every picture element, as follows:

$$A*\alpha+B*(1-\alpha)$$

and performing said operation on all the picture element components A and the picture element components B of a picture element that has the specific picture element component representing the predetermined value by using said blending coefficient $\alpha$ set by said coefficient setting means,
   wherein the picture element components A and the picture element components B comprise a luminance component Y and a color difference component selected from two color difference components according to sampling frequencies of the two color difference components.

2. An image synthesizing apparatus as claimed in claim 1, wherein a value of said specific picture element component that is outside a specified range of values that can be assumed by said specific picture element component and does not affect display of said first image is set to be a predetermined value.

3. An image synthesizing apparatus as claimed in claim 1, wherein the specific picture element component is a luminance component.

4. An image synthesizing apparatus as claimed in claim 1, wherein said coefficient setting means sets said blending coefficient $\alpha$ at zero when said specific picture element component is zero, and sets said blending coefficient $\alpha$ at a specified value that satisfies $0\leq\alpha\leq1$ when said specific picture element component is other than zero.

5. An image synthesizing apparatus as claimed in claim 1, wherein data of said first image and data of said second image are data in an ITU-R601 format having a luminance component and a color difference component as said picture element components A and said picture element components B, respectively.

6. The image synthesizing apparatus according to claim 1, wherein the specific picture element component is a color component or a color difference component when image data includes a color component or a color difference component.

7. The image synthesizing apparatus according to claim 1, wherein a relationship between the specific picture element component and the blending coefficient is preset in an image generation means.

8. The image synthesizing apparatus according to claim 1, wherein a relationship between the specific picture element component and the blending coefficient is selected by a user.

9. An image synthesizing method for synthesizing two images, said method comprising the steps of:
   setting a blending coefficient $\alpha$ for each of a plurality of specific picture elements of a first image to a single specified value,
   wherein the single specified value is proportional to a value of a specific picture element component of the plurality of specific picture elements of the first image included in picture element components A of a first image when said value of the specific picture element is not zero,
   wherein said single specified value is set to zero when said value of the specified picture element is zero; and
   performing an operation on each of the plurality of the picture element components A of the first image, and each of a plurality of picture element components B of a second image in accordance with the single specified value of each of the blending coefficients $\alpha(0\leq\alpha\leq1)$ thereby eliminating a need for setting a blending coefficient for every picture element, as follows:

$$A*\alpha+B*(1-\alpha),$$

wherein the picture element components A and the picture element components B comprise a luminance component Y and a color difference component selected from two color difference components according to sampling frequencies of the two color difference components.

10. The image synthesizing method according to claim 9, wherein the specific picture element component is a color component or a color difference component when image data includes a color component or a color difference component.

11. The image synthesizing method according to claim 9, wherein a relationship between the specific picture element component and the blending coefficient is preset in an image generation means.

12. The image synthesizing method according to claim 9, wherein a relationship between the specific picture element component and the blending coefficient is selected by a user.

* * * * *